(12) United States Patent
Tanino et al.

(10) Patent No.: US 8,029,928 B2
(45) Date of Patent: Oct. 4, 2011

(54) POSITIVE ELECTRODE ACTIVE MATERIAL POWDER

(75) Inventors: Kazuyuki Tanino, Ibaraki (JP); Reiko Sasaki, Nara (JP); Takashi Yoshida, Kanagawa (JP); Yoshihiro Kawakami, Ehime (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 12/297,455

(22) PCT Filed: Apr. 18, 2007

(86) PCT No.: PCT/JP2007/058890
§ 371 (c)(1),
(2), (4) Date: Oct. 17, 2008

(87) PCT Pub. No.: WO2007/123246
PCT Pub. Date: Nov. 1, 2007

(65) Prior Publication Data
US 2009/0104531 A1   Apr. 23, 2009

(30) Foreign Application Priority Data

Apr. 21, 2006  (JP) ................................. 2006-117614
Aug. 30, 2006  (JP) ................................. 2006-233386

(51) Int. Cl.
*H01M 4/13*      (2010.01)
*H01M 4/58*      (2010.01)
*H01M 4/62*      (2006.01)
*H01M 4/02*      (2006.01)
*H01M 2/26*      (2006.01)
*H01M 6/00*      (2006.01)
*H01M 4/88*      (2006.01)

(52) U.S. Cl. ..................... 429/218.1; 429/121; 429/122; 429/209; 429/231.95; 429/232; 252/182.1

(58) Field of Classification Search .................. 429/232, 429/231.1, 224, 231.95, 218.1, 208, 209, 429/121, 122; 252/182.1
See application file for complete search history.

(56) References Cited

U.S. PATENT DOCUMENTS

| | | | |
|---|---|---|---|
| 6,447,958 B1 | 9/2002 | Shonohara et al. | |
| 2006/0141361 A1 * | 6/2006 | Yuasa et al. | 429/232 |
| 2007/0202410 A1 | 8/2007 | Takeuchi et al. | |

FOREIGN PATENT DOCUMENTS

| JP | 06-325791 A | 11/1994 |
|---|---|---|
| JP | 06325791 | * 11/1994 |
| JP | 10-162825 A | 6/1998 |
| JP | 10-324758 A | 12/1998 |
| JP | 2000-030686 A | 1/2000 |
| JP | 2000-208147 A | 7/2000 |
| JP | 2002-015735 A | 1/2002 |
| JP | 2002-117845 A | 4/2002 |
| JP | 2002-184392 A | 6/2002 |
| JP | 2005-141983 A | 6/2005 |
| JP | 2006-086116 A | 3/2006 |
| JP | 2006-164859 A | 6/2006 |

* cited by examiner

*Primary Examiner* — Ling Choi
*Assistant Examiner* — Monique Peets
(74) *Attorney, Agent, or Firm* — Sughrue Mion, PLLC

(57) ABSTRACT

The positive electrode active material powder of the present invention is a positive electrode active material powder, including primary particles and aggregated particles of primary particles, wherein an average particle diameter of primary particles and aggregated particles of primary particles in the powder is 0.1 μm or more and 3 μm or less on a volume basis, the percentage of [volumetric sum of particles having a particle diameter of 5 μm or more]/[volumetric sum of entire particles] is 10% or less, and a BET specific surface area of the powder is more than 2 $m^2/g$ and 7 $m^2/g$ or less. When this positive electrode active material powder is used for a non-aqueous electrolyte secondary battery, it becomes possible to exhibit a high discharge capacity and also exhibit a high output at a high current rate.

7 Claims, No Drawings

POSITIVE ELECTRODE ACTIVE MATERIAL POWDER

TECHNICAL FIELD

The present invention relates to a positive electrode active material powder. Particularly, the present invention relates to a positive electrode active material powder which is used for a nonaqueous electrolyte secondary battery.

BACKGROUND ART

A positive electrode active material powder is used for a nonaqueous electrolyte secondary battery such as a lithium secondary battery. The nonaqueous electrolyte secondary battery is already practically used as a power source for cellular phones and laptop computers, and the attempts are made to apply the nonaqueous electrolyte secondary battery for middle-sized and large-sized applications such as automobiles and electric power storage units.

Japanese Unexamined Patent Publication No. 6-325791 expressly discloses, as a conventional positive electrode active material powder, a powder having an average primary particle diameter of 0.54 μm to 2.02 μm and an average secondary particle diameter of 3.6 μm to 10 μm, and Japanese Unexamined Patent Publication No. 2005-141983 expressly discloses a powder having an average primary particle diameter of 0.17 μm to 0.7 μm and a median diameter of secondary particles of 6 to 12 μm, respectively.

DISCLOSURE OF THE INVENTION

However, the nonaqueous electrolyte secondary battery produced using a conventional positive electrode active material powder is not sufficient in a discharge capacity, but is not sufficient in applications requiring a high output a a high current rate, that is, automobile applications and power tool applications such as electric tools. An object of the present invention is to provide a positive electrode active material powder useful for a nonaqueous electrolyte secondary battery, which exhibits a high discharge capacity and also exhibits a high output at a high current rate.

Under these circumstances, the present inventors have intensively studied and have found that a nonaqueous electrolyte secondary battery obtained by using a specific positive electrode active material powder can exhibit a high discharge capacity and also can exhibit a high output at a high current rate, and thus the present invention has been completed.

That is, the present invention includes the following inventions.

<1> A positive electrode active material powder, comprising primary particles and aggregated particles of primary particles, wherein an average particle diameter of primary particles and aggregated particles of primary particles in the powder is 0.1 μm or more and 3 μm or less on a volume basis, the percentage of [volumetric sum of particles having a particle diameter of 5 μm or nore]/[volumetric sum of entire particles] is 10% or less, and a BET specific surface area of the powder is more than 2 m²/g and 7 m²/g or less.

<2> The positive electrode active material powder according to <1>, wherein the composition of the positive electrode active material is represented by the formula (1):

$$Li_{x1}Ni_{1-y1}M^1_{y1}O_2 \quad (1)$$

(in the formula (1), x1 and y1 satisfy $0.9 \leq x1 \leq 1.2$ and $0 \leq y1 \leq 0.5$, respectively, and $M^1$ is Co).

<3> The positive electrode active material powder according to <1>, wherein the composition of the positive electrode active material is represented by the formula (2);

$$Li_{x2}Ni_{1-y2}M^2_{y2}O_2 \quad (2)$$

(in the formula (2), x2 and y2 satisfy $0.9 \leq x2 \leq 1.2$ and $0.3 \leq y2 \leq 0.9$, respectively, and $M^2$ is Co and Mn).

<4> A positive electrode for a nonaqueous electrolyte secondary battery, comprising the positive electrode active material powder according to any one of <1> to <3>.

<5> The positive electrode for a nonaqueous electrolyte secondary battery according to <4>, including a conductive material.

<6> The positive electrode for a nonaqueous electrolyte secondary battery according to <5>, wherein the conductive material contains a fibrous carbon material.

<7> A nonaqueous electrolyte secondary battery, comprising the positive electrode for a nonaqueous electrolyte secondary battery according to any one of <4> to <6>.

BEST MODE FOR CARRYING OUT THE INVENTION

A positive electrode active material powder of the present invention comprises primary particles and aggregated particles of primary particles, wherein an average particle diameter of primary particles and aggregated particles of primary particles in the powder is 0.1 μm or more and 3 μm or less on a volume basis, the percentage of [volumetric sum of particles having a particle diameter of 5 μm or more]/[volumetric sum of entire particles] is 10% or less, and a BET specific surface area of the powder is more than 2 m²/g and 7 m²/g or less.

In the present invention, the average particle diameter of primary particles and aggregated particles of primary particles in the positive electrode active material powder on a volume basis means a particle diameter (D50) at 50% accumulation measured from the finer particle side in an accumulative particle size distribution of primary particles and aggregated particles obtained by aggregation of primary particles on a volume basis, and a value of D50, which is a value measured by a laser diffraction particle size analyzer, is used. In the positive electrode active material powder of the invention, since primary particles and aggregated particles of primary particles are mixed, when the particle diameter of the positive electrode active material powder is measured using a laser diffraction particle size analyzer, particle diameters of primary particles and aggregated particles of primary particles are totally measured to obtain an average value of these particle diameter as a value (D50). In the present invention, by adjusting the average particle diameter to 0.1 μM or more and 3 μm or less, it is possible to obtain a positive electrode active material powder for a nonaqueous electrolyte secondary battery, which can exhibit a high discharge capacity and also can exhibit a high output at a high current rate. The average particle diameter is preferably 0.1 μm or more and 2 μm or less, and more preferably 0.1 μm or more and 1.5 μm or less. By adjusting the average particle diameter within the above range, a positive electrode active material powder for a nonaqueous electrolyte secondary battery, which exhibits a higher discharge capacity, can be obtained. When the average particle diameter is less than 0.1 μm, compatibility between the positive electrode active material powder with a conductive material and a binder described hereinafter is not good and binding properties with a positive electrode collector described hereinafter deteriorates, thereby causing deterioration of discharge capacity and cycling properties of the nonaqueous electrolyte secondary battery. Therefore, it is not preferred. When the average particle diameter is more than 3 µm, the resultant nonaqueous electrolyte secondary battery does not sufficiently exhibit a high output at a high current rate. Therefore, it is not preferred.

In the present invention, the percentage of [volumetric sum of particles having a particle diameter of 5 µm or more]/ [volumetric sum of entire particles] is 10% or less, preferably 7% or less, and more preferably 5% or less. As the percentage, a value measured by the same laser diffraction particle size analyzer as described above is used. As used herein, particles mean primary particles and aggregated particles of primary particles. When the percentage is more than 10%, the resultant nonaqueous electrolyte secondary battery does not sufficiently exhibit a high output at a high current rate. Therefore, it is not preferred. By decreasing the percentage to 7% or less, 5% or less or the like, there is a tendency that a nonaqueous electrolyte secondary battery exhibiting a higher output can be obtained.

In the present invention, a BET specific surface area of the powder is more than 2 m$^2$/g and 7 m$^2$/g or less. By adjusting the BET specific surface area of the powder within the above range, it is possible to obtain a positive electrode active material powder for a nonaqueous electrolyte secondary battery, which can exhibit a high discharge capacity and also can exhibit a high output at a high current rate. Furthermore, the BET specific surface area of the powder is preferably 2.5 m$^2$/g or more and 7 m$^2$/g or less, and more preferably 3 m$^2$/g or more and 4 m$^2$/g or less, so as to obtain a nonaqueous electrolyte secondary battery which exhibits a high discharge capacity and a high output. When the BET specific surface area of the powder is 2.0 m$^2$/g or less, it is not preferred in view of discharge capacity of the nonaqueous electrolyte secondary battery. The BET specific surface area of the powder is more than 7 m$^2$/g, it is not preferred in view of storage characteristics of the powder, binding properties with the positive electrode collector, and operability.

The composition of the positive electrode active material powder of the present invention can be the following representative compositions, that is, the composition represented by the formula (1) and the composition represented by the formula (2).

$$Li_{x1}Ni_{1-y1}M^1_{y1}O_2 \quad (1)$$

(in the formula (1), x1 and y1 satisfy $0 \leq x1 \leq 1.2$ and $0 \leq y1 \leq 0.5$, respectively, and M$^1$ is Co)

Herein, X1 is preferably 1.0 or more and 1.1 or less, and more preferably 1.0 or more and 1.05 or less, so as to further increase the discharge capacity. For the same purpose, y1 is preferably 0.05 or more and 0.3 or less, and more preferably 0.1 or more 0.2 or less.

$$Li_{x2}Ni_{1-y2}M^2_{y2}O_2 \quad (2)$$

(in the formula (2), x2 and y2 satisfy $0.9 \leq x2 \leq 1.2$ and $0.3 \leq y2 \leq 0.9$, respectively, and M$^2$ is Co and Mn).

Here, x2 is preferably 1.0 or more and 1.1 or less, and more preferably 1.0 or more and 1.05 or less, so as to further increase the discharge capacity. For the same purpose, y2 is preferably 0.4 or more and 0.8 or less, and more preferably 0.5 or more and 0.7 or less. Regarding M$^2$, Co:Mn is preferably within a range from 50:50 to 20:80, and more preferably from 40:60 to 30:70, in terms of a molar ratio.

As long as the effects of the present invention are not impaired, a portion of elements M$^1$ and M$^2$ described above may be substituted with elements such as B, Al, Ga, In, Si, Ge, Sn, Mg, Sc, Y, Ti, Zr, Hf, V, Nb, Ta, Cr, Mo, W, Tc, Fe, Ru, Rh, Ir, Pd, Cu, Ag, and Zn.

With respect to the positive electrode active material powder of the present invention, a crystal structure identified by the measurement of powder X-ray diffraction is usually a NaFeO$_2$ type crystal structure.

The surface of particles of the positive electrode active material powder of the present invention, as a core material, may be further coated with a compound containing one or more elements selected from B, Al, Ga, In, Si, Ge, Sn, Mg, and transition metal elements. Among these elements, one or more elements selected from B, Al, Mg, Co, Cr, Mn, and Fe are preferred, and Al is more preferred in view of operability. The compound includes oxides, hydroxides, oxyhydroxides, carbonates, nitrates, organic acid salts of the above elements, or mixtures thereof. Among these, oxides, hydroxides, oxyhydroxides, carbonates, or mixtures thereof are preferred When a heat treatment is carried out after above-mentioned coating treatment, the BET specific surface area of the powder after the coating and heat treatment may be less than the range of the BET specific surface area in the positive electrode active material powder of the present invention, although it varies depending on a temperature of the heat treatment. In that case, the BET specific surface area of the positive electrode active material powder in the present invention is within the range of the BET specific surface area before coating.

Next, a method of producing a positive electrode active material powder of the present invention is described.

The positive electrode active material powder of the present invention can be produced by calcining a metal compound mixture which can be converted into a positive electrode active material powder of the present invention by calcining. That is, the positive electrode active material powder can be produced by weighing compounds containing a corresponding metal element so as to have a predetermined composition, mixing and calcining the resultant metal compound mixture after mixing. For example, a complex oxide represented by Li$_{1.08}$[Ni$_{0.35}$Mn$_{0.44}$Co$_{0.21}$]O$_2$ as one of preferred compositions can be obtained by calcining a metal compound mixture which is obtained after weighing lithium hydroxide, dinickel trioxide, manganese carbonate and cobalt oxide in a molar ratio Li:Ni:Mn:Co of 1.08:0.35:0.44:0.21, and mixing.

As the compound containing a metal element, for example, it is possible to use oxides of compounds containing a metal element such as Li, Al, Ni, Mn, Co and Fe, or those which can be decomposed and/or oxidized at high temperature to be oxides, such as hydroxides, oxyhydroxides, carbonates, nitrates, acetates, halide, oxalates and alkoxides. Among these compounds, a compound containing Li is preferably a hydroxide and/or a carbonate, a compound containing Al is preferably a hydroxide and/or an oxide, a compound containing Ni is preferably a hydroxide and/or an oxide, a compound containing Mn is preferably a carbonate and/or an oxide, a compound containing Co is preferably an oxide and/or a hydroxide, and a compound containing Fe is preferably a hydroxide and/or an oxide. A complex compound containing two or more kinds of the above mentioned metal elements may be used as the compound containing a metal element.

The metal compound mixture before calcining may further contain a compound containing boron so as to enhance crystallinity of the positive electrode active material powder. The content of the compound containing boron may be usually 0.00001 mol or more and 5 mol % or less in terms of boron conversion based on the total mol % of metal elements excluding lithium in the metal compound mixture. The content is preferably 0.0001 mol % or more and 3 mmol % or less in terms of boron conversion. The compound containing boron includes boron oxide and boric acid, and boric acid is preferable. Boron further contained in the metal compound mixture may be remained in the positive electrode active material powder of the present invention after calcining, or may be removed by washing, vaporization or the like.

Mixing of the compound containing the metal element may be carried out by either dry mixing or wet mixing. However, simple dry mixing is preferable. Dry mixing is carried out using a V-type mixer, a W-type mixer, a ribbon mixer or a drum mixer, or a dry ball mill.

In view of acceleration of a solid phase reaction upon calcining, the average particle diameter of the metal compound mixture on a volume basis is preferably a value within a range of 1 μm or more and 20 μm or less. Herein, the average particle diameter of the metal compound mixture on a volume basis is measured by the same laser diffraction particle size analyzer as described above.

The metal compound mixture was optionally compressed and molded, and then calcined by retaining at a temperature within a range from 700° C. or higher and 1200° C. or lower for 2 to 30 hours to obtain a calcined product. Upon calcining, as long as a calcining vessel containing the metal compound mixture is not damaged, it is preferred to quickly heat to a retention temperature. The calcining atmosphere varies depending on the composition, and air, oxygen, nitrogen, argon or a mixture gas thereof can be used. The calcining atmosphere is preferably an atmosphere containing oxygen.

The calcined product is ground using a grinder, and thus a positive electrode active material powder of the present invention can be obtained. It is preferred to use a jet mill as the grinder in view of adjusting the percentage of [volumetric sum of particles having a particle diameter of 5 μm or more]/[volumetric sum of entire particles] to 10% or less in the present invention. In the case of the jet mill, since particles constituting the calcined product are accelerated by a jet stream and are ground by collision of particles with each other and also collision causes less strain of a crystal structure and it is easy to grind within a short time, generation of particles other than the objective particles in the present invention can be suppressed. Particles may be ground using a vibrating mill or a dry ball mill in place of the jet mill. In that case, the process may become complicated in some cases for requiring further air classification operation or the like. It is more preferred to use, as the jet mill, a fluidized jet mill equipped with a classifier built thereinto. The jet mill includes a counter jet mill (trade name, manufactured by Hosokawa Micron Group).

Next, a method for producing a positive electrode for a nonaqueous electrolyte secondary battery, comprising a positive electrode active material powder of the present invention is described. The positive electrode can be produced by supporting a positive electrode mixture containing a positive electrode active material powder of the present invention, a conductive material and a binder on a positive electrode collector, and the positive electrode for a nonaqueous electrolyte secondary battery includes a conductive material.

A carbonaceous material can be used as the conductive material, and the carbonaceous material includes a graphite powder, carbon black, acetylene black and a fibrous carbon material. Since carbon black and acetylene black are in the form of fine particles and have a large surface area, internal conductivity of a positive electrode can be enhanced and charge/discharge efficiency and rate characteristics can be improved by adding a small amount of carbon black and acetylene black to a positive electrode mixture. When carbon black and acetylene black are excessively added, binding properties of the positive electrode mixture with the positive electrode collector via a binder are deteriorated and it causes increase of internal resistance on the contrary. The content of the conductive material in the positive electrode mixture is usually 5 parts by weight or more and 20 parts by weight or less to 100 parts by weight of the positive electrode active material powder. When a fibrous carbon material is used as the conductive material, the content can be decreased.

The conductive material preferably contains a fibrous carbon material so as to enhance conductivity of the positive electrode for a nonaqueous electrolyte secondary battery. When the conductive material contains the fibrous carbon material, a/b is usually from 20 to 1000, wherein 'a' denotes a length of a fibrous carbon material, and 'b' denotes a diameter of a cross section which is perpendicular to a length direction of the material. A value of a/c is usually from 2 to 10, and preferably from 2 to 5, wherein 'a' denotes a length of a fibrous carbon material, and 'c' denotes an average particle diameter (D50) of primary particles and aggregated particles of primary particles in the positive electrode active material powder of the present invention on a volume basis. When a/c is less than 2, conductivity between particles in the positive electrode active material powder may be insufficient in some cases. When a/c is more than 10, binding properties of a positive electrode mixture and a positive electrode collector may de deteriorated. In the fibrous carbon material, electric conductivity thereof is preferably as high as possible. Electric conductivity of the fibrous carbon material is measured with respect to a sample formed so as to adjust density of a fibrous carbon material within a range of 1.0 to 1.5 $g/cm^2$. In that case, electric conductivity is usually 1 S/cm or more, and preferably 2 S/cm or more.

Specific examples of the fibrous carbon material include a graphitized carbon fiber and a carbon nanotube. The carbon nanotube may be either a single-wall or a multi-wall carbon nanotube. The fibrous carbon material may be prepared by grinding a commercially available product so as to adjust a/b and a/c within the above range. Grinding may be carried out by either a dry or wet grinding method. Dry grinding includes grinding using a ball mill, a rocking mill or a planetary ball mill, and wet grinding includes grinding using a ball mill or a disperser. The disperser includes DISPERMAT (trade name, manufactured by EKO INSTRUMENTS Co., Ltd.).

When the fibrous carbon material is used in the positive electrode for a nonaqueous electrolyte secondary battery of the present invention, the content of the fibrous carbon material is preferably 0.1 part by weight or more and 10 parts by weight or less to 100 parts by weight of the positive electrode active material powder so as to further enhance conductivity of the positive electrode. As the conductive material, the fibrous carbon material and the other carbonaceous material (graphite powder, carbon black, acetylene black, etc.) may be used in combination. In this case, the other carbonaceous material is preferably in the form of spherical fine particles. When the other carbonaceous material is used in combination, the content of the material is from 0.1 parts by weight to 10 parts by weight to 100 parts by weight of the positive electrode active material powder.

A thermoplastic resin can be used as the binder, and specific examples thereof include fluororesins such as polyvinylidene fluoride (hereafter may be referred to as PVDF), polytetrafluoroethylene (hereafter may be referred to as PTFE), an ethylene tetrafluoride/propylene hexafluoride/vinylidene fluoride copolymer, a propylene hexafluoride/vinylidene fluoride copolymer, and an ethylene tetrafluoride/perfluorovinyl ether copolymer; and olefin resins such as polyethylene and polypropylene. These thermoplastic resins may be used in combination of two or more kinds.

It is preferred that a fluororesin and a polyolefin resin are used as the binder and that the positive electrode mixture contains the fluororesin of 1 to 10% by weight to the positive electrode mixture and the polyolefin resin of 0.1 to 2% by weight to the positive electrode mixture, thereby obtaining a positive electrode mixture having excellent binding properties with the positive electrode collector.

As the positive electrode collector, Al, Ni and stainless steel can be used. Among these, Al is preferred in that it is easy to form into a thin film and is inexpensive. A method of supporting a positive electrode mixture on the positive electrode collector includes a pressure molding method, and a method of adding solvent to form a paste, applying the paste on the collector, and fixing to the collector through pressing or the like after drying. When a paste is formed, a slurry including a positive electrode active material, a conductive material, a binder and an organic solvent is prepared. The organic solvent includes amine solvents such as N,N-dimethylaminopropylamine and diethylenetriamine; ether solvents such as tetrahydrofuran; ketone solvents such as methyl ethyl ketone; ester solvents such as methyl acetate; and amide solvents such as dimethyl acetamide and 1-methyl-2-pyrrolidone.

A method of applying a positive electrode mixture on a positive electrode collector includes a slit die coating method, a screen coating method, a curtain coating method, a knife coating method, a gravure coating method, and an electrostatic spray coating method. The positive electrode for a nonaqueous electrolyte secondary battery in the present invention can be produced by the method described above.

Next, the nonaqueous electrolyte secondary battery comprising a positive electrode for a nonaqueous electrolyte secondary battery of the present invention will be described by way of a lithium secondary battery as an example of the battery.

The lithium secondary battery can be produced by encasing a separator and an electrode group, which is obtained by laminating and winding a negative electrode including a negative electrode collector and a negative electrode mixture supported on the negative electrode collector, and the above positive electrode in a battery is case, and then impregnating with an electrolyte solution containing an electrolyte dissolved in an organic solvent.

The shape of the electrode group may include, for example, a shape in which a cross section, obtained by cutting the electrode group in a direction perpendicular to a winding axis, has a shape of such as circle, oval, rectangle, or chamfered rectangle. The shape of the battery may include such as a paper-type, coin-type, cylinder-type or square-type shape.

As the negative electrode, those obtained by supporting a negative electrode mixture containing a material capable of doping/dedoping lithium ions on a nagantive electrode collector, lithium metal or a lithium alloy can be used. The material capable of doping/dedoping lithium ions specifically includes carbonaceous materials such as natural graphite, artificial graphite, cokes, carbon black, pyrolytic carbon, carbon fiber and a calcined organic polymer compound; and chalcogen compounds capable of doping/dedoping lithium ions at a lower electric potential than that of the positive electrode, such as oxide and sulfide. It is preferred to use the carbonaceous material containing a graphite material as a main component, such as natural graphite and artificial graphite, since a lithium secondary battery has high potential flatness and low average discharge potential. The carbonaceous material can be in any form, for example, flake like natural graphite, sphere like mesocarbon micro-beads, fiber like graphitized carbon fiber, and aggregate of fine powder.

It is preferred to use a negative electrode mixture containing polyethylene carbonate when the liquid electrolyte does not contain ethylene carbonate described hereinafter since cycling characteristics and large current discharge characteristics of the resultant battery are improved in some cases.

The negative electrode mixture may optionally contain a binder. The binder includes thermoplastic resins, specifically, PVDF, thermoplastic polyimide, carboxymethyl cellulose, polyethylene, and polypropylene.

The chalcogen compound used as the material capable of doping/dedoping lithium ions contained in the negative electrode mixture, such as oxide and sulfide, includes crystalline or amorphous oxide composed mainly of the Group 13, 14 or 15 elements in the Periodic Table, specifically, such as an amorphous compound composed mainly of a tin compound. These chalcogen compounds can contain carbonaceous material as a conductive material, if necessary.

The negative electrode collector includes such as Cu, Ni or stainless steel, and Cu is preferred in that it is less likely to form an alloy with lithium and is easily formed into a thin film.

A method of supporting a negative electrode mixture on the negative electrode collector includes a pressure molding method, and a method of adding solvent to form a paste, applying the paste on the negative electrode collector, and fixing to the collector through pressing or the like after drying, similar to the case of the positive electrode.

As the separator, for example, there can be used materials composed of an olefin resin such as polyethylene or polypropylene, a fluororesin, and a nitrogen-containing aromatic polymer in the form of a porous material, a nonwoven fiber or a woven fiber. The separator may be made of two or more kinds of these materials. The separator includes, for example, separators described in Japanese Unexamined Patent Publication No. 2000-30686 and Japanese Unexamined Patent Publication No. 10-324758. The thickness of the separator is preferably as thin as possible, as long as the mechanical strength is maintained, and is preferably from about 10 to 200 µm, more preferably from about 10 to 30 µm, since a volume energy density of a battery increases and internal resistance decreases.

The electrolyte in the electrolyte solution include lithium salts such as $LiClO_4$, $LiPF_6$, $LiAsF_6$, $LiSbF_6$, $LiBF_4$, $LiCF_3SO_3$, $LiN(SO_2CF_3)_2$, $LiC(SO_2CF_3)_3$, $Li_2B_{10}Cl_{10}$, a lower aliphatic carboxylic acid lithium salt, $LiAlCl_4$, and a mixture of two or more kinds may be used. It is preferred to use, as the lithium salt, at least one kind selected from the group consisting of $LiPF_6$, $LiAsF_6$, $LiSbF_6$, $LiBF_4$, $LiCF_3SO_3$, $LiN(SO_2CF_3)_2$ and $LiC(SO_2CF_3)_3$, each containing lithium, among these lithium salts.

In the electrolyte solution, the organic solvent includes carbonates such as propylene carbonate, ethylene carbonate, dimethyl carbonate, diethyl carbonate, ethylmethyl carbonate, 4-trifluoromethyl-1,3-dioxolan-2-one and 1,2-di(methoxycarbonyloxy)ethane; ethers such as 1,2-dimethoxyethane, 1,3-dimethoxypropane, pentafluoropropyl methyl ether, 2,2,3,3-tetrafluoropropyl difluoromethyl ether, tetrahydrofuran and 2-methyltetrahydrofuran; esters such as methyl formate, methyl acetate and γ-butyrolactone; nitriles such as acetonitrile and butyronitrile; amides such as N,N-dimethylformamide and N,N-dimethylacetoamide; carbamates such as 3-methyl-2-oxazoline; sulfur-containing compounds such as sulfolane, dimethyl sulfoxide and 1,3-propanesultone; and those in which a fluorine substituent group is further introduced into the above organic solvents. Usually, two or more kinds of these organic solvents are used in combination. Among these organic solvents, a mixture solvent containing carbonates is preferred and a mixture solvent of cyclic carbonate and acyclic carbonate, or a mixture solvent of cyclic carbonate and ethers are more preferred.

The mixture solvent of cyclic carbonate and acyclic carbonate is preferably a mixture solvent containing ethylene carbonate, dimethyl carbonate and ethylmethyl carbonate, since it has a wide range of operation temperature and has excellent load characteristics, and is persistent even when a graphite material such as natural graphite or artificial graphite is used as a negative electrode active material.

It is preferred to use an electrolyte solution containing a lithium salt containing fluorine, such as $LiPF_6$, and an organic solvent having a fluorine substituent group, since an excellent safety improvement effect is obtained. A mixture solvent containing ethers having a fluorine substituent group, such as pentafluoropropylmethyl ether and 2,2,3,3-tetrafluoropropyldifluoromethyl ether, and dimethyl carbonate is more preferred, since it has excellent large current discharge characteristics.

A solid electrolyte may be used in place of the electrolyte solution.

As the solid electrolyte, for example, polymer electrolytes such as a polyethylene oxide polymer compound and a polymer compound containing at least one of a polyorganosiloxane chain and a polyoxyalkylene chain can be used. A so-called gel type electrolyte obtained by impregnating a polymer with a nonaqueous electrolyte solution can also be used. When using a sulfide electrolyte such as $Li_2S$—$SiS_2$, $Li_2S$—$GeS_2$, $Li_2S$—$P_2SS$ or $Li_2S$—$B_2S_3$, and an inorganic compound electrolyte containing a sulfide such as $Li_2S$—$SiS_2$—$Li_3PO_4$ or $Li_2S$—$SiS_2$—$Li_2SO_4$, safety can be further enhanced.

The present invention will be illustrated in more detail below by way of Examples.

(1) Measurement of Particle Size Distribution of Positive Electrode Active Material Powder Using Mastersizer 2000 manufactured by Malvern Instruments Ltd. as a laser diffraction scattering particle size distribution analyzer, particle size distribution was measured. As a dispersion medium, an aqueous 0.2 wt % sodium hexametaphosphate solution was used. As an average particle diameter on a volume basis, a value of a particle diameter (value of D50) of the entire particles was used.

(2) Measurement of Bet Specific Surface Area of Positive Electrode Active Material Powder In a nitrogen gas flow at 150° C. for 15 minutes, 1 g of a powder was dried and then a BET specific surface area was measured using FlowSorb II2300 manufactured by Micromeritics Instrument Corporation.

(3) Measurement of Powder Filling Density of Positive Electrode Active Material Powder In a 10 ml glass measuring cylinder, 10 g of a positive electrode active material powder was placed, tapped 200 times, and then powder filling density (tap density) was measured. The measurement was repeated twice and an average value of the measurement values was taken as powder filling density.

(4) Production of Plate-Shaped Battery for Charge/Discharge Test

A mixture of a positive electrode active material powder, scaly natural graphite as a conductive material and acetylene black, and a solution of PVDF as a binder in 1-methyl-2-pyrrolidone (hereinafter may be referred to as NMP) were mixed and kneaded in a weight ratio active material:scaly graphite:acetylene black:PVDF of 87:9:1:3 to obtain a positive electrode mixture paste. After the resultant positive electrode mixture paste was applied on a 20 μm thick Al foil serving as a positive electrode collector, the coated Al foil was dried at 60° C. using a hot air dryer for one hour, vacuum-dried at 50° C. for 8 hours, subjected to a compaction treatment using a roll press and then cut into pieces with a size of 1.5 cm×2 cm to obtain a positive electrode. The weight of the resultant positive electrode was measured, the weight of a positive electrode mixture was calculated by subtracting the weight of the Al foil from that of the positive electrode, and then the weight of the positive electrode active material powder was calculated from the weight ratio of the pasty positive electrode mixture.

The resultant positive electrode, an electrolyte solution prepared by dissolving $LiPF_6$ in a mixed solution of ethylene carbonate (hereinafter may be referred to as EC), dimethyl carbonate (hereinafter may be referred to as DMC) and ethylmethyl carbonate (hereinafter may be referred to as EMC) in a mixing ratio of 30:35:35 (volume ratio) (hereinafter may be referred to as $LiPF_6$/EC+DMC+EMC) to obtain a solution of $LIF_6$ of 1 mol/liter, a polyethylene porous film as a separators and a counter electrode and a reference electrode made of metallic lithium were assembled to obtain a plate-shaped battery.

EXAMPLE 1

(1) Synthesis of Positive Electrode Active Material Powder

Nickel hydroxide (manufactured by KANSAI CATALYST CO., LTD.), manganese oxide (manufactured by JAPAN PURE CHEMICAL CO., LTD.), lithium carbonate (manufactured by Honjo Chemical Corporation), cobalt oxide (manufactured by Seido Chemical Industry Co., Ltd.) and boric acid (manufactured by Yoneyama Chemical CO., LTD) were weighed in a molar ratio Li:Ni:Mn:Co:B of 1.07:0.35:0.44:0.21:0.03 and then ground and mixed by a dry ball mill using alumina balls of 15 mmφ as media for 4 hours (peripheral velocity: 0.7 m/s) to obtain a powder. The resultant powder was placed in a tunnel-shaped continuous furnace and then calcined in the air at 1,040° C. for 4 hours to obtain a calcined product. The calcined product was coarsely ground using a roll crusher and then ground under the conditions of a powder feed amount of 2 kg/h and a pressure of 4 kg/cm² using a jet mill (manufactured by Nippon Pneumatic Mfg. Co., Ltd., spiral jet mill, Model NPK100) to obtain a ground powder. Coarse particles were removed from the ground powder using a sieve having an opening diameter of 45 μm to obtain a positive electrode active material powder. The positive electrode active material powder had an average particle diameter of 1.3 μm, [volumetric sum of particles having a particle diameter of 5 μm or more]/[volumetric sum of entire particles] of 3%, a specific surface area of 3.3 m²/g and powder filling density of 1.1 g/cc.

(2) Evaluation of Charge/Discharge Performances when used as Positive Electrode of Lithium Secondary Battery A plate-shaped battery was produced by using the resultant positive electrode active material and a charge/discharge test was carried out under the following conditions by way of constant current/constant voltage charge and constant current discharge. The results are shown in Table 1.

Charge/Discharge Conditions:

A current value of IC is calculated by multiplying the weight of the positive electrode active material powder obtained above using 1 C=150mA/g as a current value per unit weight of a positive electrode active material.

Charging was carried out under the conditions of a maximum charging voltage of 4.3 V, a charging time of e hours, a charging current of 0.2 C, while discharging was carried out under the conditions of a minimum discharging voltage of 3.0 V and a discharging current of 0.2 C, 1 C, 5 C and 10 C. Charging was carried out under the same conditions before each discharge test.

EXAMPLE 2

(1) Synthesis of Positive Electrode Active Material Powder

With respect to a positive electrode active material powder obtained in the same manner as in Example 1, except that the molar ratio of each element of Li:Ni:Mn:Co:B was adjusted to 1.10:0.36:0.42:0.21:0.03, the average particle diameter, [volumetric sum of particles having a particle diameter of 5 µm or more]/[volumetric sum of entire particles], the specific surface area and the powder filling density were measured. As a result, the same results as in Example 1 were obtained. Using the positive electrode active material powder, a plate-shaped battery was produced, and then a charge/discharge test was carried out by way of constant current/constant voltage charge and constant current discharge. As a result, the same results as in Example 1 were obtained.

COMPARATIVE EXAMPLE 1

(1) Synthesis of Positive Electrode Active Material Powder

Nickel hydroxide (manufactured by KANSAI CATALYST CO., LTD.), manganese oxide (manufactured by JAPAN PURE CHEMICAL CO., LTD.), lithium carbonate (manufactured by Honjo Chemical Corporation), cobalt oxide (manufactured by Seido Chemical Industry Co. Ltd.) and boric acid (manufactured by Yoneyama Chemical CO., LTD) were weighed in a molar ratio Li:Ni:Mn:Co:B of 1.08:0.35:0.44:0.21:0.03 and then ground and mixed by a dry ball mill using alumina balls of 15 mmϕ as media for 4 hours (peripheral velocity: 0.7 m/s) to obtain a powder. The resultant powder was placed in a tunnel-shaped continuous furnace and then calcined in the air at 1,040° C. for 4 hours to obtain a calcined product. The calcined product was ground using a dry ball mill using alumina balls of 15 mmϕ as media for 7 hours (peripheral velocity: 0.7 m/s) and then coarse particles were removed using a sieve having an opening diameter of 45 µm to obtain a positive electrode active material powder. The positive electrode active material powder had an average particle diameter of 3.2 µm a percentage of [volumetric sum of particles having a particle diameter of 5 µm or more]/[volumetric sum of entire particles] of 43%, a specific surface area of 1.7 $m^2$/g and powder filling density of 1.8 g/cc.

(2) Evaluation of Charge/Discharge Performances when Used as Positive Electrode of Lithium Secondary Battery A plate-shaped battery was produced by using the resultant positive electrode active material and a charge/discharge test was carried out under the same conditions as in Example 1 by way of constant current/constant voltage charge and constant current discharge. The results are shown in Table 1.

COMPARATIVE EXAMPLE 2

(1) Synthesis of Positive Electrode Active Material Powder

A calcined product was obtained in the same manner as in Example 1 and the calcined product was ground using a dry ball mill using alumina balls of 15 mmϕ as media for 13 hours (peripheral velocity: 0.7 m/s), and then coarse particles were removed using a sieve having an opening diameter of 45 µm to obtain a positive electrode active material powder.

The positive electrode active material powder had an average particle diameter of 2.5 µm, a percentage of [volumetric sum of particles having a particle diameter of 5 µm or more]/[volumetric sum of entire particles] of 39%, a specific surface area of 1.7 $m^2$/g and powder filling density of 1.8 g/cc.

(2) Evaluation of Charge/Discharge Performances when used as Positive Electrode Active Material of Lithium Secondary Battery A plate-shaped battery was produced by using the resultant positive electrode active material and a charge/discharge test was carried out under the same conditions as in Example 1 by way of constant current/constant voltage charge and constant current discharge. The results are shown in Table 1.

TABLE 1

| Examples | Average particle diameter of powder (Specific surface area) | Percentage* of particles of 5 µm or more | Discharge capacity mah/g | | | | Rate characteristics against 0.2C (%) | | |
|---|---|---|---|---|---|---|---|---|---|
| | | | 0.2C | 1C | 5C | 10C | 1C | 5C | 10C |
| Example 1 | 1.3 µm (3.3 $m^2$/g) | 3% | 153 | 143 | 119 | 87 | 93 | 78 | 57 |
| Comparative Example 1 | 3.2 µm (1.7 $m^2$/g) | 43% | 152 | 140 | 109 | 44 | 92 | 72 | 29 |
| Comparative Example 2 | 2.5 µm (1.7 $m^2$/g) | 39% | 152 | 138 | 76 | 21 | 91 | 50 | 14 |

*Percentage of [volumetric sum of particles having a particle diameter of 5 µm or more]/[volumetric sum of entire particles]

From data of the discharge capacity and data of rate characteristics against 0.2 C in Example 1, Comparative Example 1 and Comparative Example 2 shown in Table 1, it is found that batteries using the positive electrode active powder of Example 1 exhibits a large discharge capacity and a high output even when the discharging current increases (for example, 10 C).

When the positive electrode active powder of the present invention is used for a nonaqueous electrolyte secondary battery, since it can exhibit a high discharge capacity and also can exhibit a high output at a high current rate, the positive electrode active powder of the present invention can be preferably used for a nonaqueous electrolyte secondary battery, particularly for applications requiring a high output at a high current rate, that is, automobile applications, and power tool applications such as electric tools, and thus the present invention is industrially very useful.

The invention claimed is:

1. A positive electrode active material powder, comprising primary particles and aggregated particles of primary particles, wherein an average particle diameter of primary particles and aggregated particles of primary particles in the powder is 0.1 μm or more and 3 μm or less on a volume basis, the percentage of [volumetric sum of particles having a particle diameter of 5 μm or more]/[volumetric sum of entire particles] is 5% or less, and a BET specific surface area of the powder is more than 2 m²/g and 7 m²/g or less.

2. The positive electrode active material powder according to claim 1, wherein the composition of the positive electrode active material is represented by the formula (1):

$$Li_{x1}Ni_{1-y1}M^1_{y1}O_2 \quad (1)$$

(in the formula (1), x1 and y1 satisfy $0.9 \leq x1 \leq 1.2$ and $0.05 \leq y1 \leq 0.3$, respectively, and $M^1$ is Co).

3. The positive electrode active material powder according to claim 1, wherein the composition of the positive electrode active material is represented by the formula (2):

$$Li_{x2}Ni_{1-y2}M^2_{y2}O_2 \quad (2)$$

(in the formula (2), x2 and y2 satisfy $0.9 \leq x2 \leq 1.2$ and $0.3 \leq y2 \leq 0.9$, respectively, and $M^2$ is Co and Mn).

4. A positive electrode for a nonaqueous electrolyte secondary battery, comprising the positive electrode active material powder according claim 1.

5. The positive electrode for a nonaqueous electrolyte secondary battery according to claim 4, including a conductive material.

6. The positive electrode for a nonaqueous electrolyte secondary battery according to claim 5, wherein the conductive material contains a fibrous carbon material.

7. A nonaqueous electrolyte secondary battery, comprising the positive electrode for a nonaqueous electrolyte secondary battery according to claim 4.

* * * * *